United States Patent Office 3,733,307
Patented May 15, 1973

3,733,307
COPOLYMERS OF POLYPHENYLENE ETHERS
Glenn D. Cooper, Delmar, N.Y., assignor to
General Electric Company
No Drawing. Filed Oct. 14, 1971, Ser. No. 189,193
Int. Cl. C08g 23/16
U.S. Cl. 260—61        5 Claims

ABSTRACT OF THE DISCLOSURE

Copolymers with repeating units of (a) 2,6-diaryl-1,4-phenylene ethers and (b) 2,6-dihalo-1,4- or 3,5-dihalo-1,2-phenylene ether units are provided by free radical initiated polymerization of the corresponding 2,6-disubstituted-4-halophenolates. The novel copolymers are melt processable into articles having extended high temperature resistance and those containing at least 15 mole percent of the 2,6- or 3,5-dihalo-component (b) are flame resistant.

This application relates to high molecular weight copolymers containing 2,6-diaryl-1,4-phenylene ether units and 2,6- or 3,5-dihalophenylene ether units. The new copolymers are useful for the production of films, fibers and other molded and extruded shapes. Because they contain halogen, many of the copolymers, particularly those containing more than 15 mole percent of dihalophenylene ether units, are fire resistant.

BACKGROUND OF THE INVENTION

Stamatoff, U.S. 3,257,357, describes a family of copolymers having 2,6-dialkyl-substituted - 1,4 - phenylene ether units and 2,6-dihalo-1,4- or 3,5-dihalo-1,2-phenylene ether units. Of the 2,6-dialkyl-substituted units, only those containing from 1 to 4 carbon atoms, inclusive, are described. Such copolymers are very useful to prepare monofilaments, fibers, ribbons and the like with flame resistant properties. However, their other physical properties tend to deteriorate on exposure to elevated temperatures for prolonged periods. Accordingly, articles fabricated from the Stamatoff copolymers, while flame resistant, particularly after aging at high temperatures, tend to be brittle and lack the toughness and flexibility necessary for many applications.

It has now been discovered if the 2,6($C_1$–$C_4$ alkyl) substituents in such copolymers are replaced by aromatic hydrocarbon substituents containing a higher number of carbon atoms, and particularly from 6 to 12 carbon atoms, and, optionally, halogen, a useful family of new copolymers will be provided with entirely unexpected toughness and flexibility, particularly in film and fiber form at high temperatures. The products after molding or extrusion also have an excellent surface appearance and clarity. Moreover, with proper attention to the amount of 2,6- or 3,5-dihalogen substitution, copolymers are provided which combine the flame resistance of the Stamatoff-type copolymers with outstanding toughness.

DESCRIPTION OF THE INVENTION

According to the present invention there are provided novel copolymer compositions comprising (a) From 10 to 90 mole percent of 2,6-diaryl-1,4-phenylene ether units of the formula

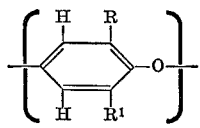

wherein R and $R^1$ are aryl, alkylaryl, haloaryl or arylaryl of from 6 to 12 carbon atoms and (b) From 90 to 10 mole percent of 2,6-dihalo-1,4- or 3,5-dihalo-1,2-phenylene ether units of the formula

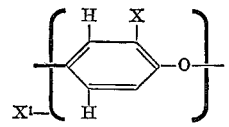

wherein X and $X^1$ are halogen.

The units in such copolymers can be either randomly joined or present in alternating block of repeating units. In preferred compositions, component (a) will comprise from about 25 to about 85 mole percent of the copolymer and component (b) will comprise from about 75 to about 15 mole percent of the copolymer.

With respect to the 2,6-diaryl-1,4-phenylene oxide units (a) above, R and $R^1$ are, independently, aryl or alkylaryl, haloaryl or arylaryl groups from 6 to 12 carbon atoms. Halogen is preferably chloro or bromo. Among preferred such groups are phenyl; 3- or 4-methylphenyl; 3- or 4-ethylphenyl: 3,4- or 3,5-dimethylphenyl; 3-chlorophenyl; 4-bromophenyl or 3- or 4-phenylphenyl.

With respect to the 2,6-dihalo-1,4- or 3,5-dihalo-1,2-phenylene ether units (b) above, X and $X^1$ are, independently, halogen, i.e., chloro, bromo, iodo and fluoro. Preferred such halogen substituents are chloro, bromo and iodo. Especially preferred are chloro substituents.

In the copolymer compositions, the ratio of units (a) to (b) will vary broadly. Generally, the amount of 2,6-diaryl-1,4-phenylene ether units (a) will range from 10 to 90 mole percent and the amount of the 2,6-dihalo-1,4- or 3,5-dihalo-1,2-phenylene ether units (b) will range from 90 to 10 mole percent. As has been mentioned, the preferred ratio will be from about 25 to 85 mole percent of (a) units and from about 75 to 15 mole percent of (b) units. Within this preferred range, the best combination of flame resistance, elevated temperature toughness properties and processability is obtained.

The copolymer compositions of the present invention are prepared by procedures which are based on those described in detail in the above-mentioned Stamatoff patent, substituting the corresponding diaryl-substituted-4-halo phenolic starting materials for the 2,6-di($C_1$–$C_4$ alkyl) substituted-4-halophenols used as comonomers in the patent. Components (b) is derived from the corresponding 2,4,6-trihalophenol.

The general procedure for preparing the present copolymers comprises admixing an initiator such as an inorganic peroxide, an organic acid peroxide, a persulfate, a hypochlorite, a hypobromite, or an organic periodate with a phenolate ion of the general formula:

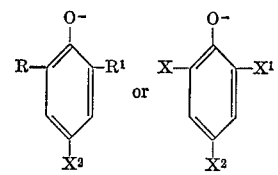

or a mixture thereof, wherein R, $R^1$, X and $X^1$ are as defined above, and $X^2$ is clorine, bromine or iodine, preferably bromine, in the presence of a liquid organic solvent capable of substantially dissolving the copolymer product, recovering the solution of copolymer in the solvent and separating the resulting copolymer by conventional methods.

According to one process for the preparation of a high molecular weight copolymer of this invention, a two phase aqeuous-organic system is used, in which the substantially water immiscible organic solvent, e.g., a liquid aromatic hydrocarbon, halogenated hydrocarbon or similar known solvent for polyphenylene ethers, is employed in dispersed form in an aqueous medium. Large droplets, such as are formed by slow agitation, conveniently provide a useful two phase system and dispersing agents, such as sodium lauryl sulfate can be used to help achieve a good dispersion. In general, the quantity of the organic solvent should be sufficient to dissolve and maintain the copolymer in solution during polymerization. The reactant phenols will be present as phenolate ions in the aqueous phase which is conveniently made up by adding the phenol and an alkali metal hydroxide to water. In general, the weight ratio of solvent to monomer should be at least one and preferably much higher. The time necessary to form the copolymer may vary from several days to less than an hour depending on the polymerization temperature, which generally is in the range of —20° to 80° C. and preferably from 25 to 60° C. Full details of useful catalysts, solvents, reaction conditions and methods for recovering copolymers by the two-phase aqueous-organic process are described in Stamatoff, U.S. 3,257,357, incorporated herein by reference.

Alternatively and preferably—because with suitable reactants there is almost exclusive copolymerization in the 1,4-configuration—the polymerization is effected in the complete absence of water. In carrying out such a process a preformed dry salt, such as an alkali metal salt, of a 2,4-disubstituted-6-halo-phenol, or mixture of such salts, is formed, for example, from the phenol and an alkali metal hydroxide or (lower)alkoxide, preferably sodium methoxide, and is suspended in an organic solvent capable of substantially dissolving the product copolymer.

Suitable phenols of the 2,4,6-trihalo type, giving rise to repeating (a) units are well known and are illustrated hereinafter and in Stamatoff U.S. 3,257,357 and U.S. 3,257,358. Suitable phenols of the 2,6-diaryl-4-halo type, giving rise to the (b) units, are well known and illustrated hereinafter.

Suitable solvents for polyphenylene ethers are well known and include aromatic hydrocarbon, halogenated hydrocarbons and similar known solvents for polymers. Preferred solvents are aromatic hydrocarbons such as benzene, toluene or any of the xylenes, trichloroethane and tetrachloroethane. Especially preferred are chlorinated aromatic solvents such as chlorobenzene, o-dichlorobenzene, chlorotoluene, chloroxylene, chloronaphthalene and the like.

To obtain high molecular weight copolymers from anhydrous salts it is necessary to add a complexing agent such as dimethyl formamide. If the process is carried out in the complete absence of water without such a complexing agent, only low molecular weight materials are provided. The type or quantity of complexing agent is not unduly critical although generally the agent will be an aprotic polar compound, such as an N,N-di(lower)alkyl carboxylic or formic acid or a di(lower)alkyl sulfoxide and employed in amounts equimolar with the phenolate ion monomer or monomers suspended in the organic liquid mixture.

To initiate polymerization, there is used a compound that generates free-radicals under the reaction conditions. There can be used one of the peroxygen containing compounds described above, e.g., benzoyl peroxide, or tert-butyl hypochlorite, in concentrations varying between 0.001 and 10 percent by weight of the reactive phenolate salt. The polymerization initiator may be added step-wise or in its entirety by means of a single addition.

The time necessary to form the copolymers may vary from several days to less than an hour depending on the polymerization temperature, and this will be generally in the range of —20° to 80° C. and preferably from 25° to 60° C.

The end of polymerization is indicated by the disappearance of substantially all of the phenolate ions and the absence of any further increase of the viscosity of the organic liquid medium containing the dissolved copolymer. The 1,4-polyphenylene ether copolymer can be separated from the organic solvent by a variety of conventional methods. For example, distillative removal of the solvent or precipitation employing a precipitant such as acetone or methanol can be used.

When the trihalophenol component (b) is 2,6-dichloro-4-bromophenol and the non-aqueous procedure outlined above is used, the copolymers will be substantially entirely 1,4-polyphenylene ethers. A preferred family of copolymers, made with this particular reactant in the non-aqueous system, will comprise (a) From about 25 to 60 mole percent of a 2,6-disubstituted (preferably phenyl - substituted) - 1,4 - phenylene ether units of the formula

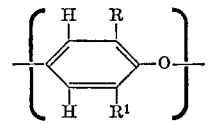

and (b) From 75 to 40 mole percent of 2,6-dichloro-1,4-phenylene ether units of the formula

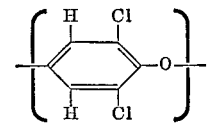

wherein R and R¹ are as defined above.

The copolymers prepared according to the present invention may be modified in known ways by the addition of conventional amounts, e.g., 1–30 parts per hundred parts of resinous components, of stabilizers, antioxidants, filaments, pigments and similar conventional additives known to those skilled in the art. The present copolymers of 2,6-diaryl-1,4-phenylene ether units and 2,6-dihalo-1,4- or 3,5-dihalo-1,2-phenylene ether units are outstanding in utility particularly at elevated temperatures as dielectric insulators, packaging materials and corrosion protecting membranes. They can be extruded into monofilaments, fibers, ribbons and the like. The present copolymers, in which the amount of copolymerized dihalo units is at least 15 mole percent are fire resistant and there is no sacrifice in other physical properties. If desired, synergists, such as antimony oxide can be included to enhance flame retardancy. Because the copolymers of the present invention have molecular weights high enough to give rise to tough flexible shapes on melt fabrication they find utility as engineering thermoplastics in many fields of use.

DESCRIPTION OF THE PREFERRED EMBODIMENTS

The following examples illustrate the preparation and properties of copolymer compositions within the scope of this invention. The examples are illustrative only and are not to be construed to limit the scope of the invention.

EXAMPLE 1

Copoly(2,6-diphenyl-1,4-phenylene and 2,6-dichloro-1,4-phenylene) ether

A solution of 0.2 g. of benzoyl peroxide initiator in 1 ml. of o-dichlorobenzene is added to a solution of 2.84 g. of the dry sodium salt of 2,6-diphenyl-4-bromophenol and 2.16 g. of the dry sodium salt of 2,6-dichloro-4-bromophenol in a mixture of 18 ml. of o-dichlorobenzene, and a complexer mixture comprising 2 ml. of dimethyl formamide and 1 ml. of dimethyl sulfoxide. The reaction solution is stirred for four hours at 45° C. and the copolymer product is isolated by precipitation with acetone, filtered, washed with 5% aqueous hydrochloric acid, then with water and again with acetone, and finally dried under vacuum at 140° C. There is obtained 2.95 g. of copolymer product having an inherent viscosity of 0.33 dl./g. when measured as a 0.5% solution in chlorobenzene at 50° C. Evaporation of a trichloroethylene solution of the copolymer yields a flexible colorless, transparent film.

The nuclear magnetic resonance (NMR) spectrum shows two signals of approximately equal magnitude at $\delta=6.27$ p.p.m. and 6.90 p.p.m. corresponding to the backbone protons of diphenyl- and dichlorophenoxy units, and a broad peak centered at $\delta=7.15$ p.p.m. corresponding to protons of the pendant phenyl groups of the diphenylphenoxy units. The peaks at $\delta=6.27$ and 6.90 p.p.m. are broader than those observed in linear homopolymers of the two phenols. This is some evidence for some random arrangement. A solution of the copolymer in m-xylene does not form a precipitate when heated overnight on a steam bath at about 95° C. This is evidence of the absence of significant amounts of the homopolymer, poly(2,6-diphenyl-1,4-phenylene)ether.

EXAMPLE 2

Copoly(2,6-dichloro-1,4-phenylene and 2,6-diphenyl-1,4-phenylene)ether 2.16 g. of the sodium salt of 2,6-dichloro-4-bromophenol is dissolved in 9 ml. of o-dichlorobenzene, 1 ml. of dimethyl formamide, and 1 ml. of dimethyl sulfoxide in a screw capped bottle. A solution of 0.1 g. of benzoyl peroxide in 0.5 ml. of o-dichlorobenzene is added, and the bottle is capped and shaken vigorously for three minutes to produce a homopoly(2,6-dichloro-1,4-phenylene) ether. A second portion of 0.1 g. of benzoyl peroxide is added, followed by a solution of 2.84 g. of the sodium salt of 2,6-diphenyl-4-bromophenol in 10 ml. of o-dichlorobenzene and the mixture is shaken for four hours at room temperature. The copolymer is isolated as in Example 1, and weighs 2.62 g. The product has an inherent viscosity of 0.31 dl./g. in chlorobenzene at 50° C. The NMR spectrum is identical to that of the polymer produced in Example 1 except that the peaks due to the aromatic backbone protons are sharper. This is some evidence for the presence of blocks of repeating units. The product has a glass transition at 222° C. It can be compression molded at 550° F. into stiff films which char but do not burn when exposed to the flame of a gas burner.

EXAMPLE 3

Example 2 is repeated, except that the second portion of peroxide initiator is omitted. The copolymer product weighs 1.97 g., and has inherent viscosity of 0.13 dl./g. The composition estimate from the relative intensities of the NMR signals at $\delta=6.25$ and 6.91 p.p.m., is 65 mole percent 2,6-dichloro-1,4-phenoxy units and 35 mole percent 2,6-diphenyl-1,4-phenoxy units.

EXAMPLE 4

Example 2 is repeated, except that the salt of 2,6-diphenyl-4-bromophenol is added only 30 seconds after the first-stage polymerization with the salt of 2,6-dichloro-4-bromophenol is initiated. Copolymer is obtained weighing 2.46 g., and having a glass transition temperature of 211° C. Differential scanning calorimetry shows a small exothermic peak at 295° C.; this is evidence of crystallization of a portion of the 2,6-diphenyl-1,4-phenoxy repeating unit segments.

EXAMPLE 5

A solution of 2.84 g. of the sodium salt of 2,6-diphenyl-4-bromophenol in 9 ml. of o-dichlorobenzene, 1 ml. of dimethyl formamide, and 1 ml. of dimethyl sulfoxide is placed in a screw capped bottle and a solution of 0.1 g. of benzoyl peroxide initiator in 1 ml. of o-dichlorobenzene is added. The mixture is shaken vigorously for three minutes, and a solution of 2.16 g. of the sodium salt of 2,6-dichloro-4-bromophenol is added. Shaking is continued for six hours and the polymer is isolated as described in Example 1. The copolymer product weighs 2.97 g., and has an inherent viscosity of 0.38 dl./g.

EXAMPLE 6

The procedure of Example 1 is repeated, substituting, respectively, for the sodium salt of 2,6-diphenyl-4-bromophenol, stoichiometric amounts of the following sodium salts:

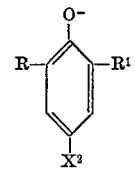

| R | R¹ | X² |
|---|----|----|
| phenyl | phenyl | Cl |
| phenyl | phenyl | I |
| o-CH₃-phenyl | o-CH₃-phenyl | Br |
| o-H₃C-phenyl | o-H₃C-phenyl | Br |
| p-H₃C-phenyl | p-H₃C-phenyl | Br |
| o-Br-phenyl | o-Br-phenyl | Br |
| o-H₅C₂-phenyl | o-H₅C₂-phenyl | Br |
| p-H₅C₂-phenyl | p-H₅C₂-phenyl | Br |
| cyclohexyl | cyclohexyl | Br |
| biphenyl | biphenyl | Br |
| 3,5-dimethylphenyl (H₃C-, H₃C-) | 3,5-dimethylphenyl (H₃C-, H₃C-) | Br |
| 3,5-dimethylphenyl | 3,5-dimethylphenyl | Br |

Copolymers according to this invention are obtained.

The procedure of Example 1 is repeated substituting for the sodium salt of 2,6-dichloro-4-bromophenol stoichiometric amounts of the following sodium salts:

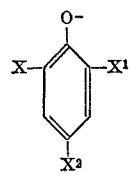

| X | X¹ | X² |
|----|----|----|
| Br | Br | Br |
| Cl | Cl | Cl |
| I | I | Br |
| Cl | Br | Br |
| Cl | I | Br |
| I | Br | Br |

EXAMPLE 7

The procedure of Example 2 is repeated, substituting for the sodium salt of 2,6-dichloro-4-bromophenol and 2,6-diphenyl-4-bromophenol, stoichiometric amounts of the salts of phenolate ions described in Example 6.

Copolymers according to this invention are obtained.

Obviously other modifications and variations of the present invention are possible in the light of the above teachings. It is therefore, to be understood that changes may be made in the particular embodiments of the invention described which are within the full intended scope of the invention as defined by the appended claims.

What is claimed is:

1. A film forming polymer consisting essentially of
   (a) from 10 to 90 mole percent of 2,6-diaryl-1,4-phenylene ether units of the formula

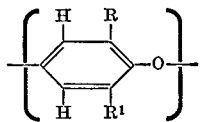

wherein R and $R^1$ are aryl, alkylaryl, haloaryl or arylaryl of from 6 to 12 carbon atoms and
   (b) from 90 to 10 mole percent of 2,6-dihalo-1,4- or 3,5-dihalo-12-phenylene ether units of the formula

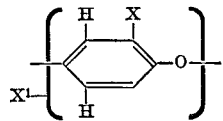

wherein X and $X^1$ are halogen.

2. A film forming polymer as defined in claim 1 consisting essentially of 25 to about 85 mole percent of (a) units and from about 75 to about 15 mole percent of (b) units.

3. A film forming polymer as defined in claim 1 wherein, in component (a), R and $R^1$ are phenyl; 3- or 4-methylphenyl; 3- or 4-ethylphenyl; 3,4- or 3,5-dimethylphenyl; 3-chlorophenyl; 4-bromophenyl; or 3- or 4-phenylphenyl.

4. A film forming polymer as defined in claim 1 wherein, in component (b), X and $X^1$ are chloro, bromo or iodo.

5. A film forming polymer consisting essentially of
   (a) from 25 to 60 mole percent of 2,6-diphenyl-1,4-phenylene ether units of the formula

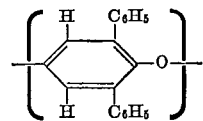

and
   (b) from 75 to 40 mole percent of 2,6-dichloro-1,4-phenylene ether units of the formula

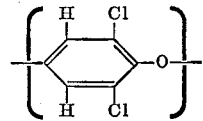

References Cited

UNITED STATES PATENTS 3,257,357   6/1966   Stamatoff.

MELVIN GOLDSTEIN, Primary Examiner

U.S. Cl. X.R.

260—33.6 R, 33.8 R, 47 ET